United States Patent
Martin

[11] Patent Number: 5,865,341
[45] Date of Patent: Feb. 2, 1999

[54] FERRULE APPLICATOR AND METHOD

[76] Inventor: Gerald D. Martin, 301 Jackson, St. Charles, Mo. 63001

[21] Appl. No.: 3,982

[22] Filed: Jan. 7, 1998

Related U.S. Application Data

[62] Division of Ser. No. 573,224, Dec. 15, 1995, Pat. No. 5,704,515.

[51] Int. Cl.$^6$ ................................................. B65H 1/00
[52] U.S. Cl. ...................................... 221/197; 221/312 A
[58] Field of Search ................................... 221/197, 297, 221/301, 312 A, 298, 289, 287

[56] References Cited

U.S. PATENT DOCUMENTS

| | | | |
|---|---|---|---|
| 1,562,196 | 11/1925 | Abrams | 294/158 |
| 1,800,459 | 4/1931 | Maclean | 156/573 |
| 1,990,267 | 2/1935 | Clarkson | 112/113 |
| 2,220,354 | 11/1940 | Sheetz | 221/296 |
| 2,520,321 | 8/1950 | McDonald | 221/287 |
| 2,650,722 | 9/1953 | Stabile | 214/8.5 |
| 2,901,146 | 8/1959 | Powell, Jr. et al. | 221/190 |
| 2,939,147 | 6/1960 | Jacobson | 1/56 |
| 3,347,360 | 10/1967 | Saltz | 206/56 |
| 3,464,590 | 9/1969 | Giannettino | 221/297 |
| 3,998,238 | 12/1976 | Nigro | 133/5 A |
| 4,050,578 | 9/1977 | Eckert | 206/340 |
| 4,087,021 | 5/1978 | Cotugno | 221/199 |
| 4,119,243 | 10/1978 | Marecek et al. | 221/298 |
| 4,216,878 | 8/1980 | Naud | 221/264 |
| 4,300,684 | 11/1981 | Smith et al. | 206/493 |
| 4,346,804 | 8/1982 | Powderly | 206/338 |
| 4,600,118 | 7/1986 | Martin | 221/1 |
| 5,161,303 | 11/1992 | Maynard et al. | 29/809 |
| 5,163,580 | 11/1992 | Beach et al. | 221/1 |
| 5,167,327 | 12/1992 | Mondello | 206/338 |

FOREIGN PATENT DOCUMENTS

| | | | |
|---|---|---|---|
| 141639 | 5/1935 | Austria | 221/297 |
| 558778 | 7/1977 | U.S.S.R. | 221/298 |

*Primary Examiner*—Kenneth Noland
*Attorney, Agent, or Firm*—Polster, Lieder, Woodruff & Lucchesi, L.C.

[57] ABSTRACT

A method of dispensing ferrules onto a work surface without requiring bend motion of the workman. The method utilizes a dispenser which is loaded from the top using a stack of nested ferrules on a retainer which is easily removable to free the ferrules in the dispenser. The dispenser has means for returning the ferrules in the applicator while releasing only the lowermost ferrule. A new universal ferrule is disclosed which allows only one adapter to be required for the stud welding tool. A portable cart can hold an applicator, a box of ferrule clips and means for disposing of the used clips is provided for wheeling the entire unit to and along the work area.

15 Claims, 10 Drawing Sheets

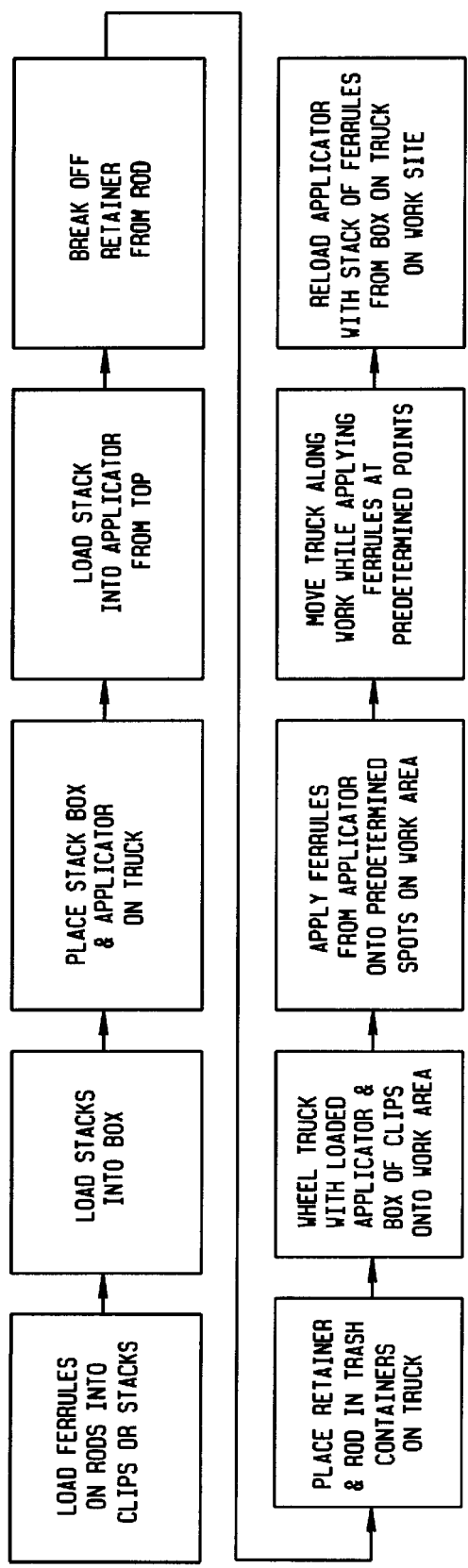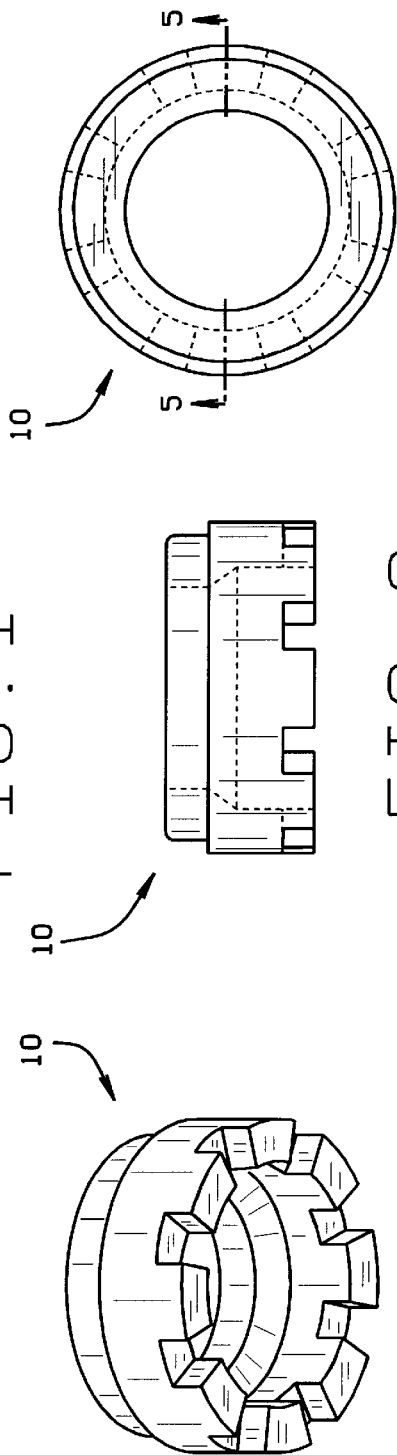

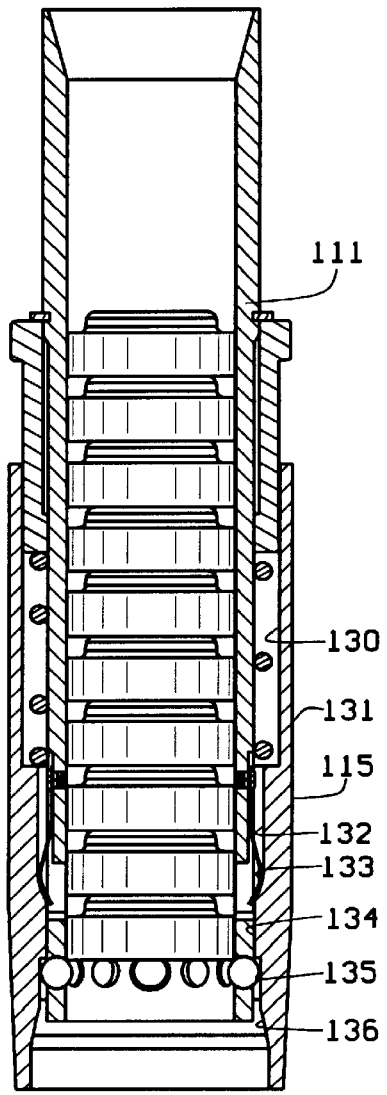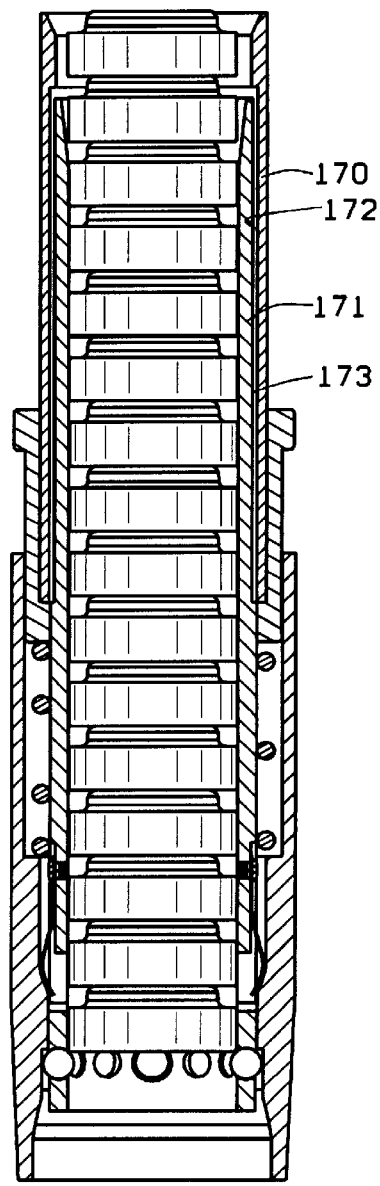
FIG. 19
FIG. 21

FERRULE APPLICATOR AND METHOD

This is a divisional of copending application Ser. No. 08/573,224, filed on Dec. 15, 1995, now U.S. Pat. No. 5,704,515.

FIELD OF THE INVENTION

This invention relates to the field of stud welding in the industrial metal working, steel fabrication and erection businesses and specifically relates to a ferrule application process which aids in the prevention of back injuries to workers, results in fast efficient application of the ferrules to predesignated spots on a work surface where studs are to be welded, and utilizes ferrules which have uniform outside dimensions in critical areas which eliminates adjustments to the stud welding apparatus.

BACKGROUND OF THE INVENTION

I have a previous U.S. Pat. No. 4,600,118 which relates to the application of ferrules for stud welding. This invention involves improvements in ferrule applicators over my earlier patent (as will be explained in detail hereinafter). In addition, this invention utilizes new and novel ferrules which are stronger, less susceptible to breakage, chipping, moisture problems, and different type ferrules have uniform outside dimensions in certain critical areas, which eliminates the present requirement for changing the ferrule holder of the stud welding gun when utilizing different sizes of ferrules and studs.

The invention utilizes a prepackaged stack of ferrules which the operator inserts into the applicator from the top end, snaps off the notched end at the bottom of the rod holding the ferrules, and then withdraws the rod, thus placing the applicator in operating condition. A unique method of making and packaging the stacks of ferrules also is disclosed.

This invention further utilizes a cart on which the applicator and ferrule package can be stored and which is provided with a receptacle for used ferrule clip assemblies. The cart can be wheeled along the deck or surface on which the applicator is applying ferrules thus allowing the operator to move along the work area without having to bend over or drag a box of ferrules with him.

Use of this invention allows the operator to apply ferrules without bending over, thus reducing the likelihood of back injury so prevalent among construction workers.

STUD WELDING

In the 1940's Ted Nelson invented the stud welding process which involves the welding of studs to a metal surface by passing a current through the stud. In the process, a ceramic ferrule, which has openings along its lower edge, concentrates the weld heat, allows gases to escape, and contains molten metal around the perimeter of the stud, is placed on a cleaned metal surface. The process involves first grinding the work surface to clean and smooth it. A worker then drags a container of ferrules along the work surface, or walks back and forth from the box of ferrules set in a stationary position to the work area each time, thus placing the ceramic ferrules individually by hand in predetermined locations on the cleaned surface. This is followed by the application of a stud in the ferrule using a welding gun which has a replaceable ferrule holder and chuck on the working end which engages the ferrule and properly locates the stud in relation to the ferrule. The welding gun is activated to weld the stud to the surface. This is a very labor intensive, costly process and because of the positions involved, results in strains and stresses to the workers. Back injuries constitute a large percentage of the workers' compensation claims in the construction industry.

PROCESS OF PRESENT INVENTION

The present invention utilizes several distinct and unique pieces of equipment which cooperate to synergistically produce the unique concept and process of this invention. These pieces of equipment include:

A. A unique ferrule construction which has greater wall thickness than present ferrules to reduce breakage and chipping and reduce moisture absorption, thus increasing weld uniformity. Various type ferrules of different inside dimensions have the same critical outside dimensions, thereby eliminating the present necessity to change the accessories on the stud applicator gun which engages the ferrule to locate the stud on the work.

B. A series of different and unique ferrule applicators, all of which feature the unique ability to accept a fixed stack of ferrules through an open top end and the ability to discharge the ferrules one at a time through the bottom end merely by placing the applicator on the work surface and sliding an outside barrel with respect to an inside barrel, thus releasing the lowermost ferrule while restraining the next adjacent ferrule.

C. A series of stacked ferrules held together by a rod inserted through the centerbores of the ferrules with a restrain on each end of the rod engaging the first and last ferrule. The restraint on the rod end which engages the lead ferrule is removable to allow the rod to be withdrawn from the stack after it is loaded into the applicator. The ferrule stacks allow a uniform number of ferrules to be loaded each time the applicator is loaded, help to eliminate breakage of the ferrules as they are retained in a fixed position during shipment, and provide a fast convenient method of loading ferrules into the applicator. This compares to the present standard of shipping approximately 1,000 ferrules placed randomly in a box which allows much breakage of the ferrules and requires the operator to grasp each ferrule individually, orientate the ferrule uniformly and bend over to place each ferrule on the floor or work surface.

D. A cart which has compartments for holding the applicator, a box of stacked ferrules, and two refuse containers to hold the discarded rods and rod restrains. The cart allows the tool and ferrules to be carried and loaded on the job and allows the ferrules to be moved along the job in an upright position without the operator having to bend over and pull or push a box of heavy loose ferrules along the work surface, or return to a fixed position box each time a ferrule or group of ferrules is placed on the work surface.

SUMMARY OF THE INVENTION

This invention comprises a system, apparatus and process for applying stud welding ceramic ferrules to a work surface from an applicator such that the operator is subjected to minimal physical stress. The invention also comprises a unique ferrule construction, usable with a universal stud welder, and an applicator for the ferrules which allows the ferrules to be dispensed individually and to be loaded in the applicator from a package of clips carried on a cart over the work surface by the operator.

These and other objects and advantages will become apparent hereinafter.

DESCRIPTION OF THE DRAWINGS

In the drawings wherein like numbers refer to like parts wherever they occur:

FIG. 1 is a schematic flow diagram of the process of the present invention;

FIG. 2 is a perspective view of a ferrule;

FIG. 3 is a side elevational view of the ferrule of FIG. 2;

FIG. 4 is a top plan view of a ferrule;

FIG. 19 is a view identical to FIG. 15 showing the dispenser back in loaded position;

FIG. 20 is an exploded view of the dispenser of FIGS. 15–19;

FIG. 21 is a vertical sectional view of still another modification of the invention;

DETAILED DESCRIPTION

Figure 5:
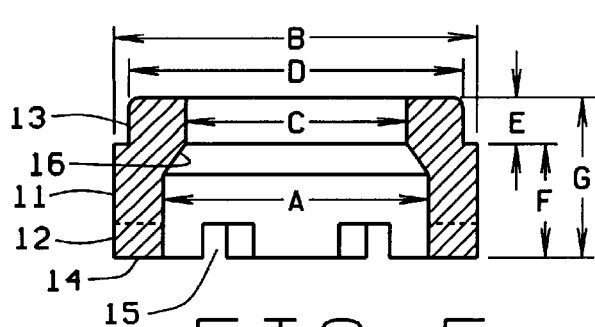
FIG. 5 is a vertical sectional view taken along line 5—5 of FIG. 5.

FIG. 1 shows a schematic flow diagram of the process of the present invention. In the present process, the unique ferrules (to be described hereinafter in detail) are specially loaded onto rods to form stacks or clips. The rods have retainers on each end with at least the lower retainer being removable.

The ferrule stacks are loaded into boxes in an upright position. This allows a predetermined number of ferrules to be loaded on each rod and a predetermined number of stacks to be placed into each box, thus insuring each box has the same number of ferrules. In present processing, boxes of loose ferrules are sold by weight, and since the density and moisture content of the ferrules can vary, the user is never certain of the precise number of ferrules in each box, making planning for a job difficult.

The stacking of ferrules into clips and loading the clips into boxes usually is done remote from the work site with only the boxes of ferrule stacks delivered to the site.

At the work site, a box of ferrule stacks and an applicator (to be described in detail hereinafter) are loaded onto a wheeled hand truck which is operated by the person who will apply the ferrules to the work area.

To load the applicator, a box of ferrule clips is opened and a stack of ferrules is removed and inserted into the applicator through the open top of the applicator.

The retainer on the bottom of the rod is removed by breaking the rod at a predetermined notch into which the retainer fits, thus allowing the retainer to fall off the rod. The rod is then withdrawn from the ferrules, thereby releasing the ferrules into the applicator and where they are retained by applicator apparatus (to be described hereinafter).

The discarded clip ends, retainers, and rods are placed into two trash containers on the cart.

The loaded applicator and truck (containing the box of ferrule stacks) are placed on the job work area at the job site and the ferrules are released one-by-one by the operator onto predetermined spots on the work surface. The operator does not have to bend or kneel during this operation, but can maintain substantially an upright position.

The truck is moved along the job site and when the applicator is empty, it is refilled on site with a clip of ferrules from the box carried on the truck.

FERRULES

FIGS. 2–5 show the unique universal ferrules 10 of this invention.

The ferrules 10 are used to hold heat for the weld, allow gases to escape, keep molten metal around the stud, and to a lesser extent to shield workers' eyes from the light of welding.

The ferrules used in stud welding concerning construction projects generally are of three sizes, namely ¾" F, ¾" WTD and ⅞" F. The ¾ F and ⅞" F are used on bare beams and the ¾" WTD is used to weld through a steel deck to attach the stud to the beam beneath. The numerals "¾" and "⅞" refer to the outside diameter of the stud being welded and to the approximate inside diameter (I.D.) of the ferrule. Each of the present conventional ferrules has a different outside diameter (O.D.) and inside configuration. The stud welding gun must attach to the ferrule to locate the stud in the proper location on the work surface. Thus, when switching from either ¾" and ¾" WTD to ⅞" size studs using present ferrules, the adapter accessory of the stud welding gun must be changed, which results in lost time for the operator and added expense for different accessories; whereas one accessory fits all of the ferrules of this application, due to the unique outside dimensions of these ferrules.

The present ¾" WTD ferrules 10 are shown in FIGS. 2–5 and all ¾" F, ¾" WTD, and ⅞" F now have the same collar outside diameter while maintaining the original internal diameter for the internal cavity as is presently industry standards for all three. In addition, the ferrules 10 have thicker walls and thicker tops in the ¾" sizes than is conventional in the industry. This results in the ferrules 10 being more breakage resistant, which avoids blow-up of the ferrules when used in the weld process. Also, the thicker ferrules give a better weld because of reduced moisture in the weld process, which process is premised on certain conditions being present during welding.

Each ferrule 10 has a body 11 which has a skirt portion 12 and a top collar 13. The bottom edge 14 of the skirt 12 comprises a series of weld vents 15 which can have different shapes and dimensions, but generally there are from 8 to 20 vents 15 per ferrule. The vents 15 extend from 0.050" to 0.130" into the skirt 12 from the bottom edge 14 and are from 0.085" to 0.300" wide. The internal diameter (A) of the ferrule skirt 12 is about 0.915" for ¾" studs to about 1.050" for ⅞" studs, which is standard in the industry. The outside diameter (B) of the ferrule skirt 14 is from about 1.380" to 1.400" for all sizes, whereas the standard ferrules for the industry have a skirt outside diameter of 1.200" for ¾" ferrules to 1.440" for ⅞" ferrules. Thus, the skirt 14 has a standard wall thickness of about 0.245" for ¾" studs which is substantially greater than the industry standard of 0.150" resulting in greater strength and less likelihood of breakage or chipping of the ferrule vents 15 and more uniformity in the vent area. There also is less moisture uptake in the vent area, which reduces the likelihood of the ferrule 10 exploding during welding and provides for more uniform welds because there is not undesirable amounts of moisture present.

The skirt wall thickness for ⅞" studs is about 0.175" which is close to industry standards and is enough to obtain the foregoing advantages.

The ferrule collar 13 has an internal diameter (C) of about 0.778" for ¾" studs to 0.910" for ⅞" studs, which conforms to the industry standard. However, the outside diameter (I)) of the ferrule collar 13 is about 1.200"+0.010" for all sizes, whereas the standard ferrules of the industry have collar outside diameters of 1.050" for ¾" studs to 1.240" for ⅞" studs. This allows a single outside diameter size ferrule to be used with both ¾" and ⅞" studs and allows a single adapter to be used on the stud weld gun for all three sizes of studs, while allowing each of the three ferrules to maintain their original unique inside configuration and diameter.

The depth (E) of the collar 13 has a dimension of about 0.185" to 0.195" which is comparable to industry standards.

The height of the skirt (F) is about 0.415" compared to 0.360" to 0.490" for standard ferrules.

The overall height (G) of the ferrules 10 from skirt 12 to collar 13 is about 0.590" compared to 0.665" to 0.750" for conventional ferrules. The reduced height counteracts the greater bulk in the skirt and collar so that the weight of the ferrules is only between 10% to 30% heavier than standard ferrules.

The unique and special dimensions of "E", "F" and "G" are critical for the operations of the tool shown in FIGS. 15–20. Connecting the collar 13 and the skirt 12 on their internal surfaces are frusto-conical surfaces 16. This is standard in the industry.

One of the critical ferrule dimensions for engaging a stud welding tool is the outside diameter (D) of the collar 13. The outside skirt diameter (B) also is critical because present industry ferrules will either fall straight through the tool without engaging the stops, or they will stick in the tool because they are too large. The overall height (G) is critical because if the ferrule is too short two ferrules will drop from the tool, or if it is too large, none will drop from the tool. The height of the shirt (F) is important when the form of the tool shown in FIGS. 15–21 is used because the spring retainers need to engage the collar 13. The height (F) also is important in the welding process to set the stud at the proper height for consistent welds.

Figure 6:
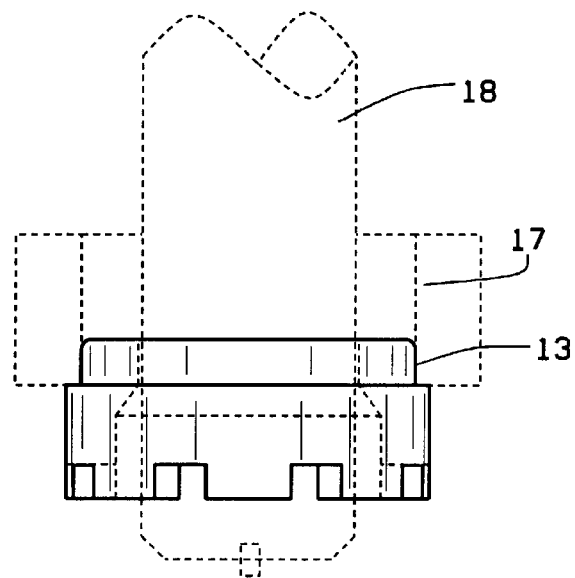
FIG. 6 is a side elevational view of the ferrule with a stud and ferrule engaging attachment shown in broken lines.

As shown in FIG. 6, a horseshoe shaped retainer accessory 17 (shown in phantom lines) is located on the stud welding gun (not shown) and the accessory 17 engages the ferrule collar 13 to locate the stud 18 (also shown in phantom lines in FIG. 6) with respect to the ferrule 10. In the ferrules 10 of the present invention, the collar outside diameter of each size ferrule is substantially the same, i.e., 1.200"+/−0.010", whereas in industry standard ferrules, the collar outside diameter is from 1.035" to 1.240" and requires different horseshoe accessories 17 for the stud welder. Use of the present ferrule 10, therefore, eliminates the necessity for the stud welder operator to change accessories 17 every time he changes ferrule size. This saves time and cost.

FERRULE STACK

Figure 7:
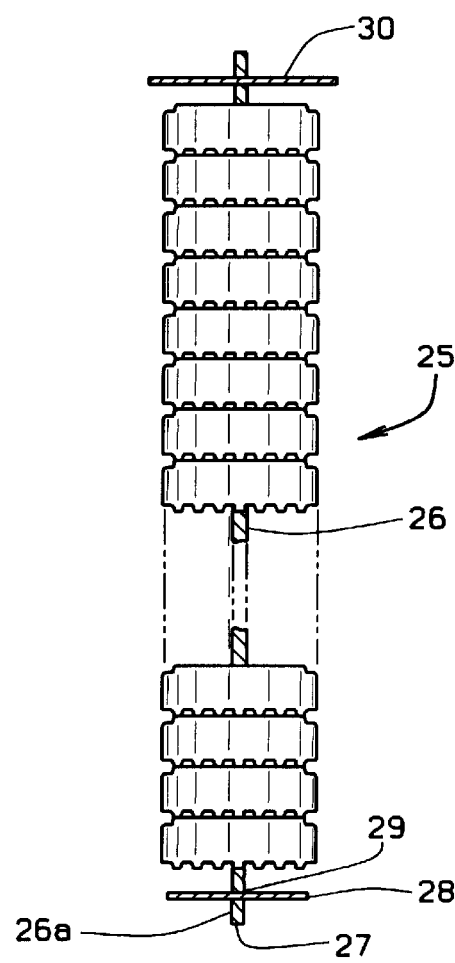
FIG. 7 is a side elevational view of a clip of ferrules.
Figure 7A:
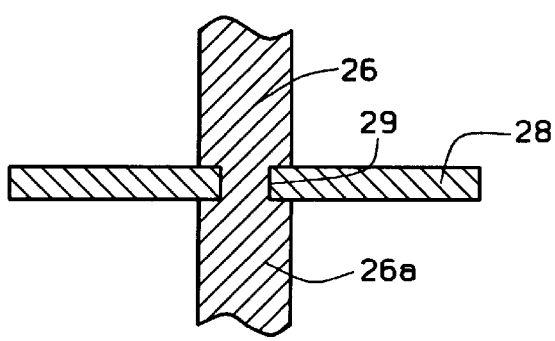
FIG. 7A is a fragmentary sectional view taken through the stem and lower retainer of the ferrule dip.

FIG. 7 shows the unique ferrule stack or clip 25 of this invention. The stacks or clips 25 are fabricated by loading the individual ferrules 10 on a rod 26 which is positioned in the center openings or centerbores of the ferrules 10. The ferrules 10 are always facing in the same direction. On the lower or leading end 27 of the rod 26 is a small retainer 28, such as a speed clip. The retainer 28 is smaller than the outside diameter of the ferrules 10 and larger than the inside diameters. An area of weakness 29 in the rod 26 is positioned where the retainer 28 engages the rod 26. This allows the retainer 28 and the lower rod portion 26a to be easily severed from the remainder of the rod 26. The retainer 28 separates from both parts of the rod 26,26a, so that if the retainer 28 should fall to the work surface, it will lie flat and not be a hazard to the workmen. Detachable retainers also can be used. The rod 26 can be metal, plastic, etc. On the top end of the rod 26 is a larger retainer 30, which is larger than the outside diameter of the ferrule 10 and also is larger than the inside diameter of the tool. Thus, the top clip 30 will not fit inside the tool. This assures that the ferrules are loaded in the proper direction for the stud welding process.

The stacks 25 are loaded into a box or other suitable container (not shown) in an upright position with the ferrule ends 14 downward. On the work site, the operator merely opens the container, places a stack 25 in a dispenser (to be described hereinafter) through the open top of the dispenser, breaks the rod 26 at the area of weakness 29, or otherwise removes the lower retainer 28 to free the ferrules 10. However, as will be explained hereinafter, the dispenser will engage and retain the lowest ferrule in the clip 25. The small retainer 28 and rod portion 26a are discarded (placed in a suitable container on the cart), and the remainder of the rod 26 and top retainer 30 are withdrawn from the centerbores of the ferrules 10 and from the dispenser and are discarded into the proper trash containers provided for on the cart.

The small clip retainer 28 is sized to pass through the dispenser while also retaining the lowermost ferrule 10. Thus, it has a larger diameter than the ferrule internal diameter, but smaller than the ferrule outside diameter. The top retainer 30 must be larger than the ferrule outside diameter and the dispenser inside diameter to hold the ferrules 10 assembled in the clip 25, but it has no restrictions on a maximum diameter.

DISPENSING TOOLS

First Form of the Dispenser

Figures 8, 8A:
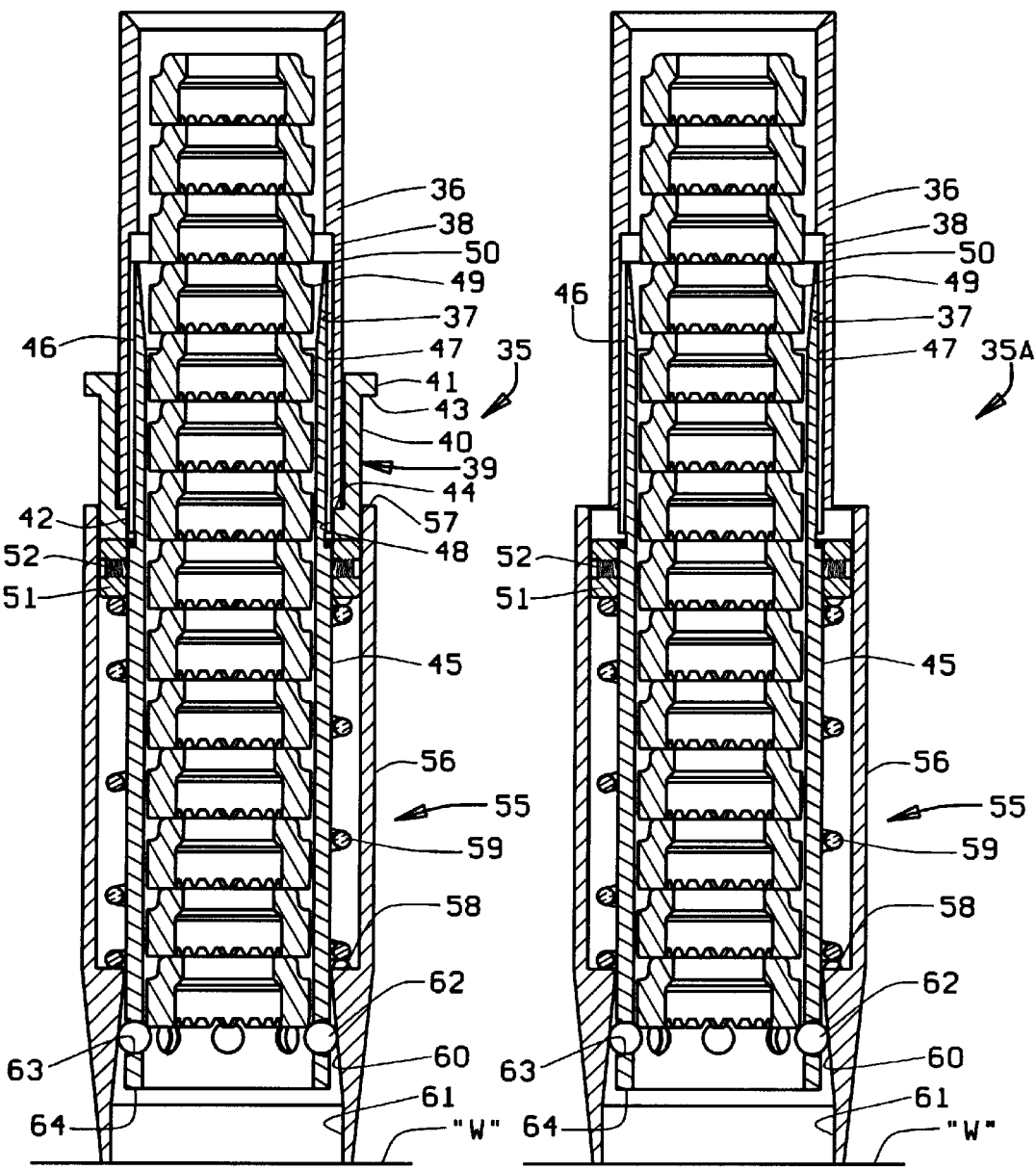
FIG. 8 is a vertical sectional view of a first form of dispenser showing the dispenser in loaded position.
FIG. 8A is a view similar to FIG. 8 of a modified form of dispenser.
Figures 9, 10:
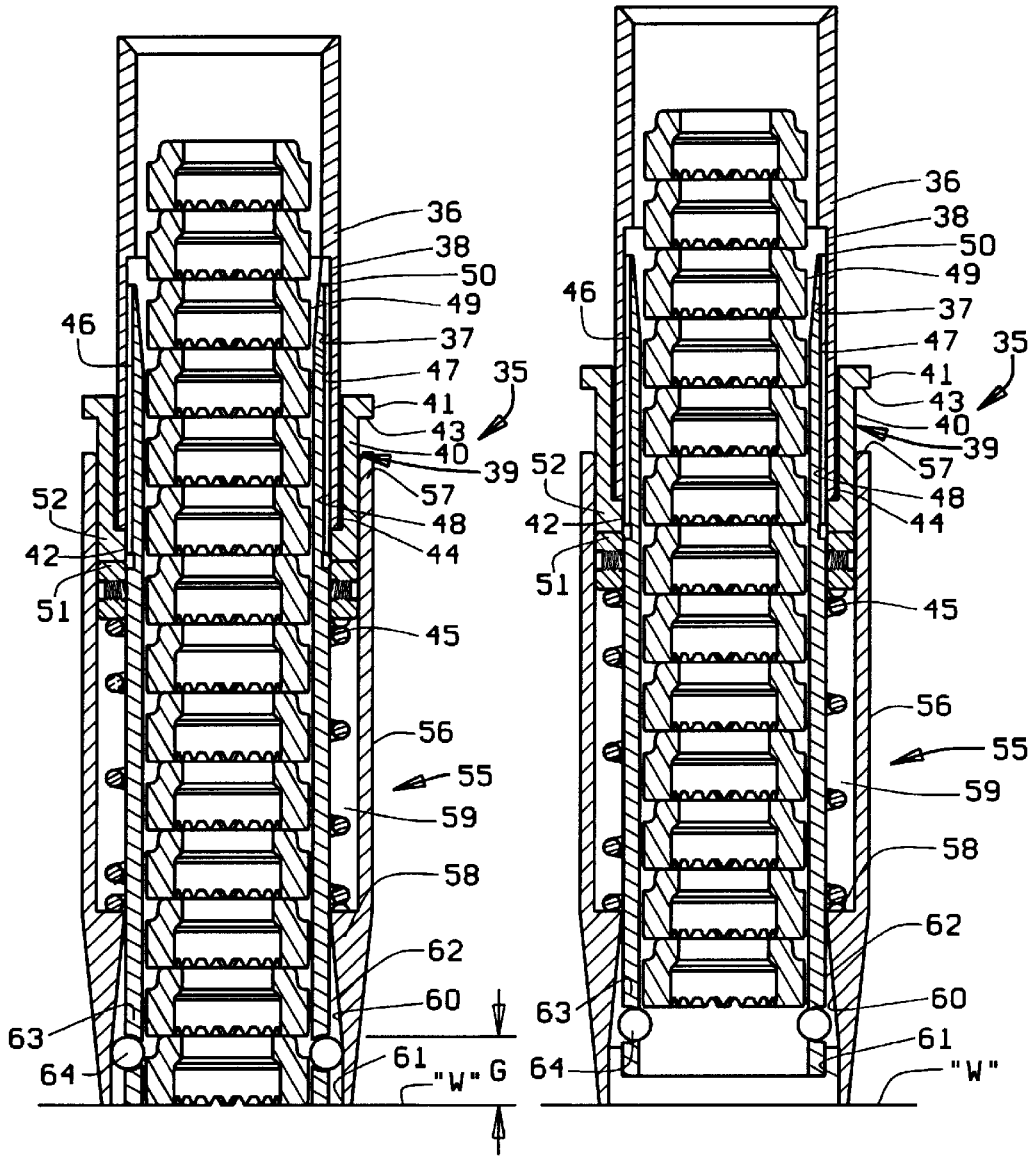
FIG. 9 is a view of the dispenser of FIG. 8 showing the dispensing of a ferrule.
FIG. 10 is a view of the dispenser of FIG. 8 showing the ferrules retained in the dispenser.

FIGS. 8, 9 and 10 show a first form of the dispenser 35. The dispenser 35 comprises a ferrule barrel 36 which has an interior counterbore 37 terminating in an interior shoulder 38. A motion restrictor 39, having a "Z" shaped cross-section, fits onto the lower end of the barrel 36. The motion restrictor 39 has a central cylindrical portion 40 terminating in an external collar 41 at the top end and an internal collar 42 at the bottom end. The external collar 41 defines an external shoulder 43 and the internal collar 42 defines an internal shoulder 44. A cylindrical inner sleeve 45 has external threads 46 on its top end. These threads 46 engage corresponding internal threads 47 on the ferrule barrel 36. A tapered surface 49 terminating in an end shoulder 50 defines the top edge of the inner sleeve 45.

A collar 51 is locked to the inner sleeve 45 by set screws 52 at a predetermined location. The collar 51 engages the bottom edge of the motion restrictor internal collar 42.

A nose cone 55 has a cylindrical body portion 56 which is slidable over the collar 51 and the cylindrical portion 40 of the motion restrictor 39. The nose cone body portion 56 has a top end 57 which engages the motion restrictor external shoulder 41 to limit the upward travel of the nose cone 55. The nose cone 55 has an internal shoulder 58 which is slidable over the outer surface of the inner sleeve 45. Trapped between the nose cone internal shoulder 58 and the bottom edge of the collar 51 is a spring 59 which encircles the inner sleeve 45. The inner surface of the leading or working end of the nose cone 55 has a frusto-conical surface 60 terminating in a cylindrical surface 61. The outwardly inclined frusto-conical surface 60 acts as a cam surface for retainer balls 62 positioned in openings 63 in the leading end of the inner sleeve 45.

The openings 63 in the inner sleeve 45 are positioned above the end 64 of the inner sleeve 45 a distance so as to release one ferrule 10 from the inner sleeve 45. The remaining ferrules 10 are free in the sleeve 45, but the height "G" of the ferrules only allows one ferrule at a time to be released. The balls 62 are positioned to engage the penultimate ferrule 10. Thus, one ferrule 10 at a time is released from the dispenser 35. The sleeve openings 63 are sized to allow only a portion of each of the balls 62 to move into the interior of the sleeve 45. The entire ball 62 cannot pass through the opening 63. Thus, the balls 62 are not lost when a ferule 10 is dispensed.

The spring 59 urges the nose cone 55 downwardly towards the working end of the dispenser 35. Because of the inclined inner nose cone surface 60, the retainer balls 62 prevent the nose cone 55 from flying off the end of the tool 35.

As shown in FIG. 9, the lowermost ferrule 10 is free, but its height "G" retains the rest of the ferrule stack in the dispenser. As the sleeve 45 moves upwardly, the balls 62 move beneath the penultimate ferrule 10, and retain the stack in the dispenser.

When the dispenser 35 is empty, the cam inclined frusto-conical cam surface 60 urges the balls 62 into the cylinder defined by the inner sleeve 45, so that when a ferrule clip 25 is loaded into the dispenser 35, it is retained in the dispenser 35. This is shown in FIG. 8.

To operate the dispenser 35, a ferrule clip 25 is inserted into the barrel 36 and the small retainer 28 slips through the barrel 36 and the inner sleeve 45 until the lowermost ferrule 10 engages the balls 62 (FIG. 8). The retainer 28 then is removed and the rod 26 and upper retainer clip 30 are withdrawn and discarded as described previously.

To dispense a ferrule 10, the ferrule barrel 36 is urged downwardly against a work area "W". This moves the barrel 36, the motion restrictor 39, the collar 51, the inner sleeve 45 and the balls 62 downwardly as well and compresses the spring 59. At the same time, the nose cone 55 is moved upwardly relative to the inner sleeve 45 . The relative movement is such as to release the lowermost ferrule 10 by freeing the balls 62 to move outwardly from beneath the lowermost ferrule 10. The weight of the ferrule 10 bearing on the inclined surfaces of the balls 62 moves the balls 62 outwardly from the inner sleeve toward the nose cone frusto-conical surface 60 and then, as relative movement of the sleeve 45 and nose cone 55 continues, toward the cylindrical surface 61. This motion is illustrated in FIG. 9. The distance of the relative movement of the nose cone 55 and the inner sleeve 45 is determined by the height "G" of the ferrule 10 being dispensed.

After the lowermost ferrule 10 drops (FIG. 9), the dispenser 35 is lifted from the work surface "W", and, the spring 59 urges the nose cone 55 downwardly and the nose cone frusto-conical surface 60 urges the balls 62 inwardly into the cylindrical space in the inner sleeve 45 above the dispensed ferrule. The balls 62 at the same time, move into engagement with the penultimate ferrule 10 and retain it in the inner sleeve 45 (FIG. 10). The balls 62 engage the lower edge of the penultimate ferrule 10.

When the dispenser 35 is raised from the work surface "W", the lowermost ferrule 10 remains on the work surface "W", and the balls 62 hold the next ferrule 10 so the tool 35 is ready to dispense the now lowest ferrule.

The tool 35 is assembled by locating the lock collar 51 on the sleeve 45 and locking the set screws 52 in place; compressing the spring 59 until the end of the inner sleeve 45 protrudes from the front end 64 of the nose cone 55. At this time, the ball bearings 62 are placed in the openings 63 and the nose cone 55 is released so that it locks the balls 62 in place in the openings 63. Thereafter the motion restrictor 39 and the ferrule barrel 36 are positioned on the tool 35.

FIRST MODIFICATION OF FIRST EMBODIMENT

A modification of the embodiment shown in FIGS. 8, 9 and 10 is shown in FIG. 8A. This embodiment, the tool 35A does not have the motion restrictor 39 and does not have the advantage of physically limiting upward travel of the nose cone 55.

SECOND MODIFICATION OF FIRST EMBODIMENT

Figure 11:
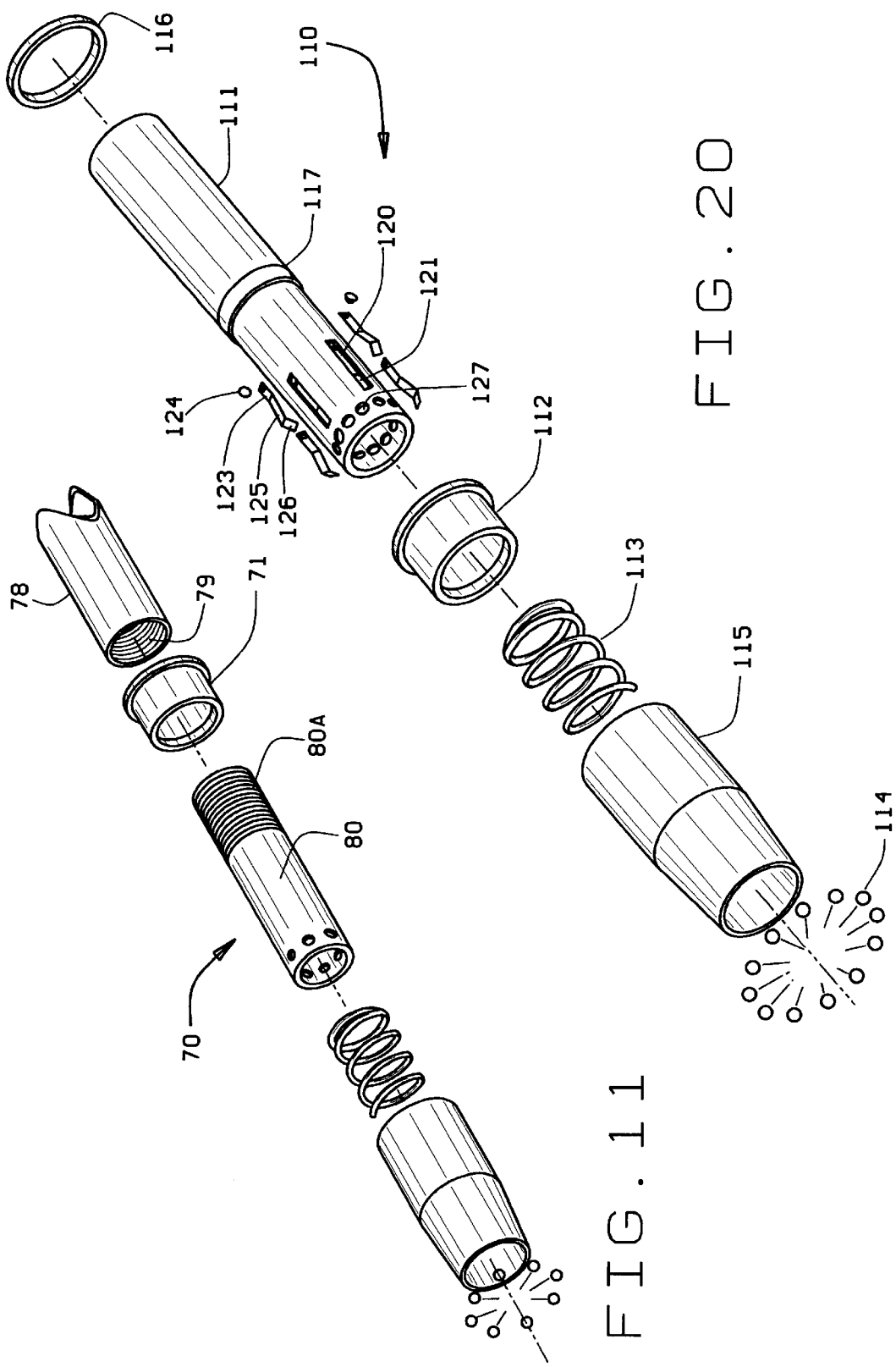
FIG. 11 is an exploded view of another modification of the dispenser shown in FIG. 8.
Figure 12:
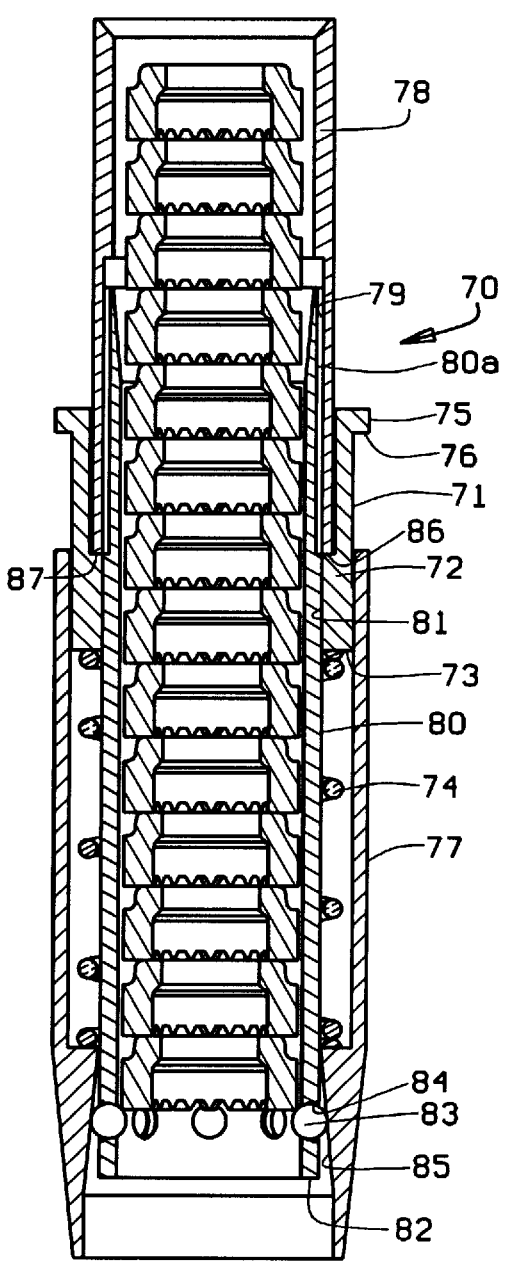
FIG. 12 is a vertical sectional view of the modification of the dispenser showing in FIG. 11 with the dispenser in loaded position.

Another modification of the embodiment shown in FIGS. 8–10 is shown in FIGS. 11 and 12. This dispenser 70 utilizes a unified motion restrictor collar member 71. The motion restrictor collar 71 has a bottom internal collar area 72 with an internal bottom shoulder 73 to engage the spring 74. It also has an external collar 75 with an inner shoulder 76 which engages the upper end of the nose cone 77. The barrel 78 is internally threaded at its lower end 79 to mate with external threads 80A on the inner sleeve 80. The motion restrictor collar member 71 is located by the position of the barrel 78 on the inner sleeve 80 because the internal shoulder 86 engages the end 87 of the barrel 78. The member 71 is positioned to give the proper tension and compression to the spring 74. The operation of this embodiment is substantially similar to that described for FIGS. 8–10.

The dispenser tool 70 is assembled in the same manner as the tool 35 except that the barrel 78 is threaded onto the inner sleeve 80, and the member 71 is used to locate the spring 74.

To assemble, the spring 74 is compressed until the leading edge 82 of the sleeve 80 protrudes from the nose cone 77.

The balls 83 are positioned in the sleeve openings 84 and the nose cone 77 is released, so that the frusto-conical surface 85 traps the balls 83 in the openings 84.

THIRD MODIFICATION OF THE FIRST EMBODIMENT

Figure 13:
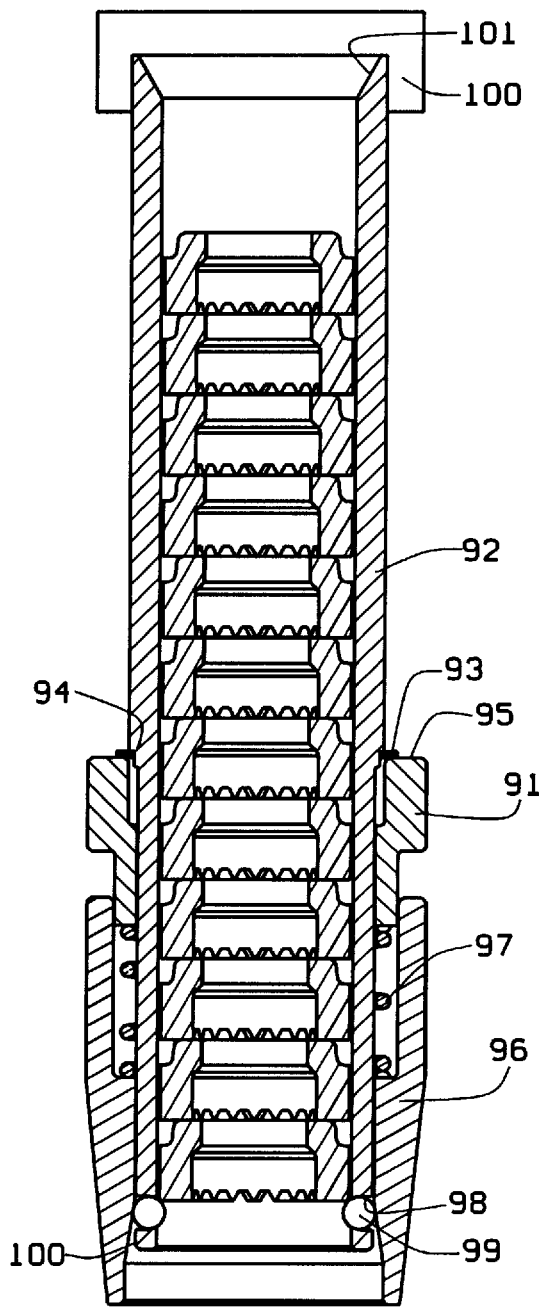
FIG. 13 is a vertical sectional view of a further modification of the dispenser showing the dispenser in loaded position.
Figures 14, 15:
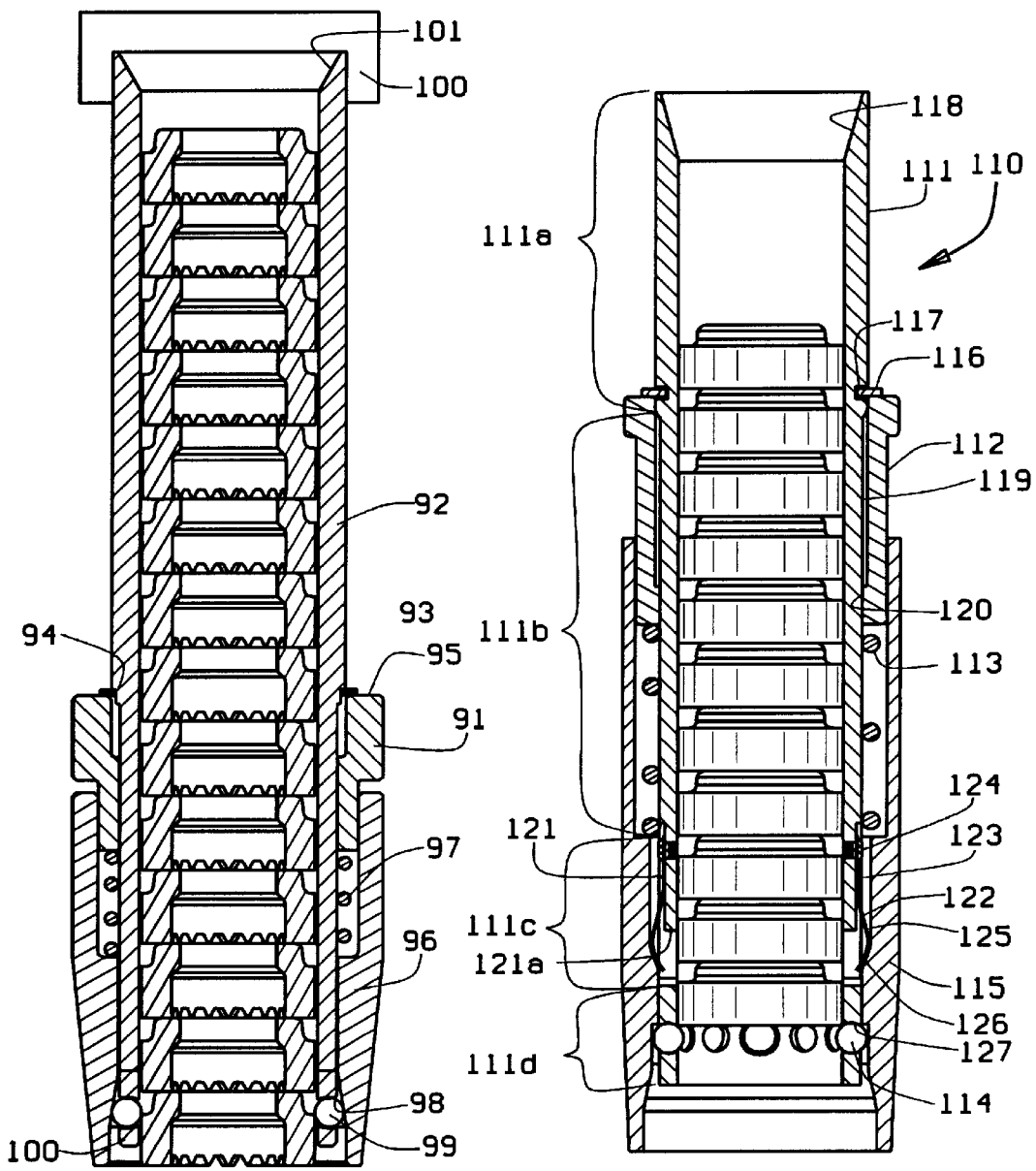
FIG. 14 is a view similar to FIG. 13 showing the dispenser moving toward dispensing position.
FIG. 15 is a vertical sectional view of another modification of the invention showing the dispenser in loaded position.
Figure 18:
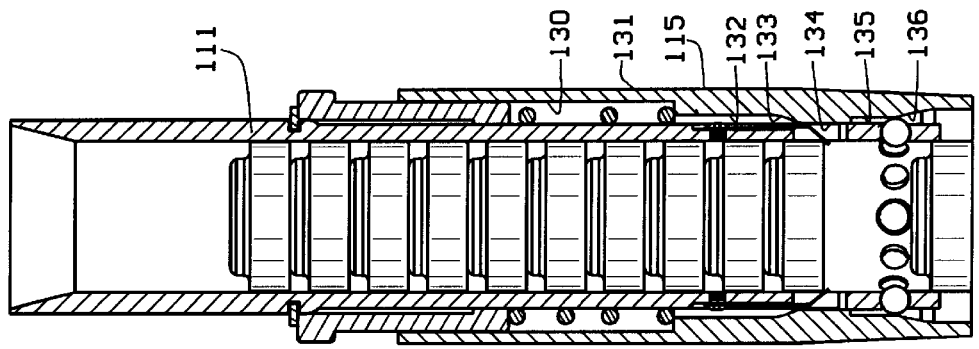
FIG. 18 is a view similar to FIG. 15 showing the dispenser returning to loaded position.
Figure 17:
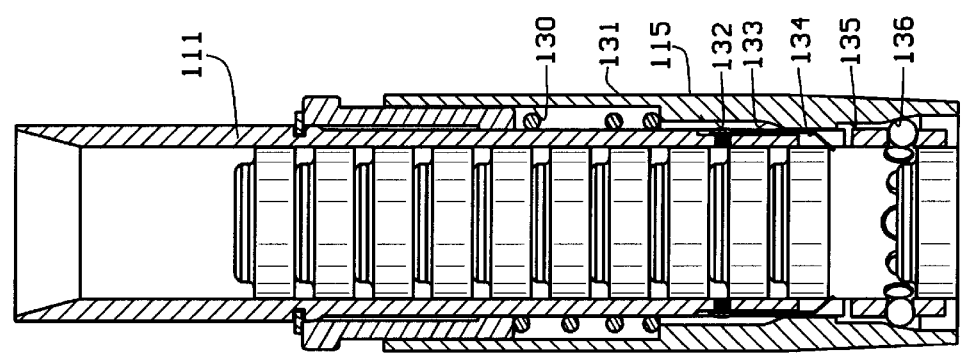
FIG. 17 is a view similar to FIG. 15 showing the dispenser in dispensing position.
Figure 16:
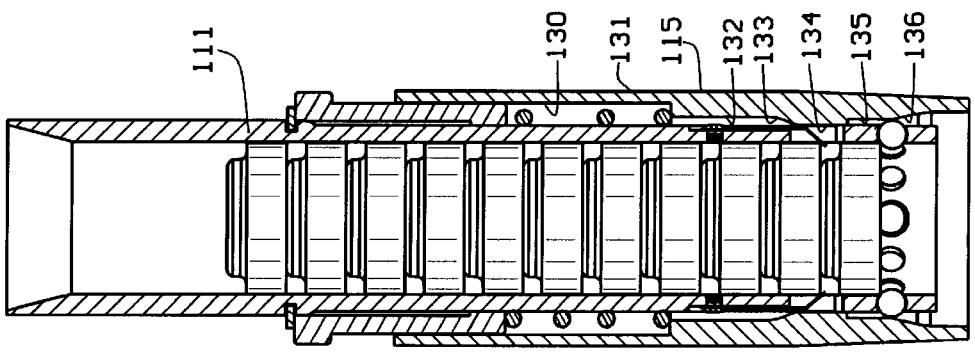
FIG. 16 is a view similar to FIG. 15 showing the dispenser moving toward dispensing position.

A modification of the applicator or dispenser 90 is shown in FIGS. 13 and 14. In this embodiment, a unified motion restrictor collar member 91 is used. The member 91 is located on the barrel 92 by a lock washer or Spirolox ring 93 positioned in a groove 94 in the outside of the barrel 92. The external upper shoulder 95 of the collar member 91 engages the lock ring 93. The barrel 92 is made of one piece and has openings 98 in the lower end which retain the balls 99.

The device 90 is assembled in a manner similar to the previous applicators, except that the lock ring 93 is positioned in the groove 94 and the nose cone 96, the spring 97 and the motion restrictor collar member 91 are slid over the outer surface of the barrel 92 to engage the lock ring 93. The lower barrel end is moved past the lower nose cone end so that the balls 99 can be loaded into the openings 98. The parts are held in assembled relationship because the balls 99 cannot pass completely through the openings 98 and the force of the spring 97 urging the nose cone 96 downward engages the inclined cam surface 100 with the fixed balls 99 and locks the parts together.

Optionally, if desired, an end cap 100 can be fastened to the open top end 101 of the barrel 92 in any of the embodiments of FIGS. 8–14 to retain the ferrules 10 in the barrels. The barrel cap 100 is shown only in FIG. 13, but can be used with any of FIGS. 8–14.

SECOND EMBODIMENT OF DISPENSER

FIGS. 15–20 show a second embodiment of dispenser 110. This modified dispenser 110 includes a one piece barrel 111, a combined one piece motion restrictor and collar 112, a spring 113, retaining balls 114, and a nose cone 115. The parts are held in assembled relation by a lock washer 116 positioned in a groove 117 in the barrel 111. The barrel 111 and the nose cone 115 are shaped differently compared to those same parts previously described herein The barrel 111 has essentially four distinct areas, 111*a*, 111*b*, 111*c*, and 111*d*. The upper end 111*a* is cylindrical and has an outwardly tapered top end 118 to accommodate loading of ferrules. The upper end 111*a* is provided with the groove 117 and lock washer 116. The second section 111*b* has a reduced outside diameter and defines an external cylindrical surface 119 which is engaged by an internal collar 120 on the motion restrictor. The spring 113 fits around the surface 119. The third section 111*c* is provided with four longitudinal slots 121. The lower end of each slot 121 terminates in an opening 121*a* through the barrel wall 111. Positioned in the slots 121 are resilient spring retainer members 122. The spring members 122 each have a flat portion 123 anchored in the slot 121 by a screw 124 or other suitable means. The springs 122 also have an outwardly inclined portion 125 and an inwardly inclined portion or finger 126 which normally is positioned in the opening 121*a*, but which also is designed to enter the interior of the barrel 111 where the ferrules 10 are stored. The lowermost barrel section 111*d* contains the openings 127 which hold the retaining balls 114.

The purpose of the finger portion 126 is to engage the penultimate ferrule in the clip 25 while the last ferrule is released. The operation of the dispenser 110 is shown in the sequence of FIGS. 15–19.

The relation of the finger portion 126 and the ferrule 10, particularly certain dimensions of the ferrule 10 is critical. The diameter "D" of the ferrule collar 13 is critical. It cannot be so large or small as to interfere with the movement of the spring fingers 126. The fingers 126 have to emerge at the ferrule collar area 13 or above the skirt dimension "F" on the lower ferrule 10 and below the end 15 of the next highest ferrule 10. In other words, the fingers 126 must not engage the ferrule 10 being released or interfere with its release.

The nose cone 115 has a modified construction compared to those previously discussed. The nose cone 115 has a generally cylindrical body which includes an upper portion which slidingly engages the outer surface of the motion restrictor 112 and houses a counterbore 130 which terminates in an internal shoulder 131. The spring 113 is trapped between the motion restrictor 112 and the internal shoulder 131. A reduced counterbore 132 connects the shoulder 131 to a cam surface 133 which terminates in an internal boss 134 which is sized to ride on the outer surface of the barrel 111. Beneath the boss 134 is an enlarged counterbore 135 designed to retain the balls 114 inside the central opening in the barrel 111 to interfere with movement of the ferrules 10 out of the barrel 111. An outwardly inclined frusto-conical surface 136 allows the balls 114 to move out of the path of the ferrules 10 so that the ferrules 10 can be discharged one at a time from the barrel 111.

In operation, the balls 114 normally restrict discharge of the ferrules 10 from the end of the barrel 111 (FIG. 15). When the dispenser 110 is placed on a work surface and the barrel 111 is forced downwardly (FIGS. 16–17), the balls 114 release the lower most ferrule 10 and the fingers 122 are urged into engagement with the next ferrule to hold it in the barrel 111. As the barrel 111 is released, the spring 113 urges the nose cone 115 downwardly to force the balls 114 beneath the ferrule which, is retained by the fingers 126 while at the same time the retainers 122 move back into the counterbore 132 and out of engagement with the lowermost ferrule, so that the ferrule is only held in the barrel 111 by the balls 114 and is ready to be discharged when the dispenser is again activated.

To assemble the dispenser 110, the resilient retainer members 122 are fastened in the slots 120 by the screws 124. The motion restrictor 112, the spring 113 and the nose cone 115 are placed on the barrel 116 and the washer 116 is attached to the barrel 111. The spring 113 is compressed until the end of the barrel protrudes from the front end of the nose cone 115. The balls 114 are placed in the barrel openings 127 and the nose cone 115 is released to trap the balls 114 in the openings 127.

FURTHER MODIFICATIONS OF DISPENSER OF FIGS. 15–20

The modification shown in FIGS. 15–20 can be used with any of the constructions shown in FIGS. 8–14. In other words, a separated collar and motion restrictor can be used, or a separated barrel and sleeve can be used. Also, a barrel end cover 100 can be utilized on any embodiment.

FIG. 21 shows a specific preferred modification of the structure shown in FIGS. 15–20 in which the barrel 111 is in two parts 170,171 and the retainer clip 116 is replaced by threaded engagement denominated by the numbers 172,173 on the upper barrel section 170 and the lower barrel section 171 respectively. The two part barrel 170,171 is similar to the construction shown in FIGS. 11 and 12 and parts 78 and 80 there denominated as barrel 78 and inner sleeve 80.

CART

Figure 22:
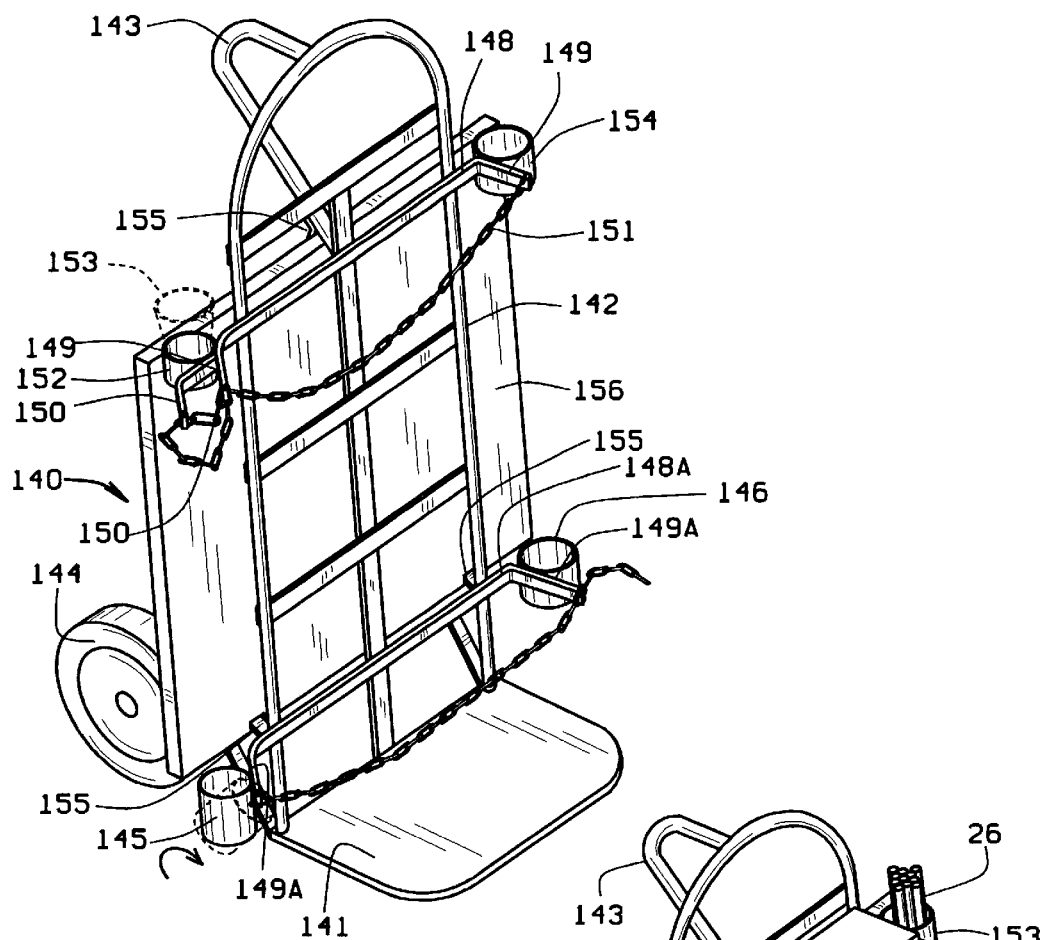
FIG. 22 is a perspective view of an empty hand truck for carrying the dispensers and boxes of ferrules along the work site.
Figure 23:
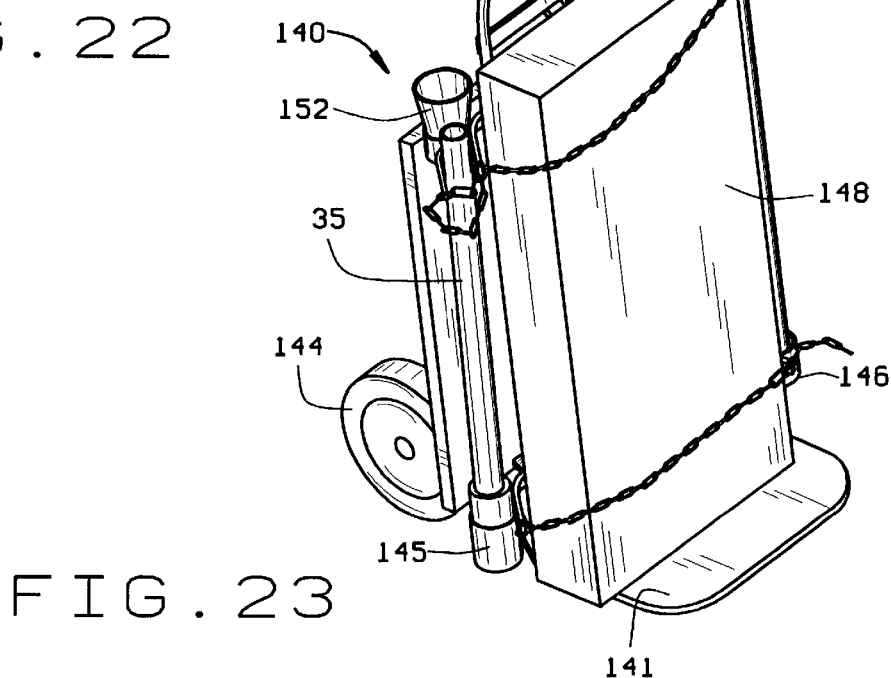
FIG. 23 is a perspective view of the hand truck of FIG. 22 showing the equipment loaded onto the truck.

FIGS. 22 and 23 show the cart 140 which is used with this invention. The cart 140 includes a base 141, a back frame 142, a handle 143, and wheels 144. The cart has upper and lower U-shaped brackets 148, 148A secured to the back frame 142. Each of the brackets 148,148A has forwardly projecting arms 149,149A at the ends thereof respectively. Secured to one of the arms 149A of the lower bracket 148A is an open top cup 145. The cup retainer 145 is designed to hold a tool 35,35A, 70, 110. The cup 145 is pivotable forwardly as indicated by the arrow in FIG. 22 to facilitate loading ferrules into the tool and to facilitate removal of the tool from the cart 40. The top bracket 148 has an L-shaped extension 150 which, with the arm 149 defines an area above the cup 145 which is designed to hold the top of the tools 35,35A, 70, 110. A chain 151 is looped between the free ends of the elements 149,150 to form a top enclosure to keep the tool from falling forward during use of the cart 140 and to retain the box of ferrules 148. Positioned on the back of the extension 150 is a receptacle 152 designed to hold a removable cup 153 (shown in broken lines in FIG. 22) for the lower portions 26a of the rods 26 as well as the retainers 28. Positioned on the opposite top arm 149 is a cylindrical retainer 154 designed to hold the discarded top portions of the stems 26. The lower ends of the stems 26 are held in a cup receptacle 146 which is positioned on the outside of the arm 149A and in alignment with the cylindrical retainer 154. The area between the bracket arms 149,149 and 149A,149A is occupied by a box of ferrule stacks 148.

Positioned at the back side of the frame 142 are clips 155 for holding a working board 156 used to bridge areas of the work surface when working on metal corrugated decks or similar surfaces. Brackets 157 are positioned on the frame 142 and support an axle on which the wheels 144 are journaled.

This invention is intended to cover all changes and modifications of the example of the invention herein chosen for the purposes of the disclosure which do not constitute departures from the spirit and scope of the invention.

What is claimed is:

1. A ferrule applicator comprising
   A) a cylindrical center member having an open top, a centerbore which accommodates a stack of ferrules, an open bottom, and an annular series of ball receptacle openings adjacent to the open bottom, the openings communicating with the centerbore, but sized so that the opening at the centerbore is smaller in diameter than the opening on the outer surface of the cylindrical member,
   B) a nose cone having a cylindrical body portion with a centerbore adapted to slide over the outer surface of the cylindrical member, a counterbore at its upper end terminating in a internal shoulder, an enlarged bore at its lower end sized to pass ferrules therefrom, a frusto-conical surface connecting the centerbore and the enlarged bore,
   C) a Z-shaped motion restrictor having a top end, a lower end, an outer intermediate cylindrical surface beginning at its lower end, and an annular lower internal shoulder, said nose cone counterbore being slidable on the outer surface of the cylindrical member,
   D) a lock means for fixing the location of the motion restrictor on the center member,
   E) spring means interposed between the lower internal shoulder of the motion restrictor and the internal shoulder of the nose cone urging the nose cone downwardly and the center member upwardly, and
   F) balls positioned in the center member openings and retained by the frusto-conical nose cone surface, the balls moving out of the center member centerbore when the center member is moved downwardly relative to the nose cone, thereby freeing a ferrule, and moving into engagement with the next adjacent ferrule when the spring returns the center member to its upward position.

2. The ferrule applicator of claim 1 including a removable cover on the top of the center member.

3. The ferrule applicator of claim 2 wherein the lock means is a lock ring extending outwardly from the outer surface of the center member and engaging the top of the motion restrictor.

4. The ferrule applicator of claim 1 wherein the center member is in two parts and the lock means is a threaded engagement between the internal surface of the one center member part and the external surface of the other center member part.

5. A ferrule applicator comprising
   A) a cylindrical top barrel member having an open top and bottom and a centerbore which accommodates a stack of ferrules, a counterbore in the barrel at the bottom opening with an internal shoulder defining the counterbore end, the counterbore being internally threaded at the end adjacent to the bottom opening,
   B) a cylindrical inner sleeve having open top and bottom ends and a centerbore which accommodates a stack of ferrules, the sleeve having a reduced diameter portion adjacent to its upper end, the reduced diameter portion having external threads thereon, the sleeve having an annular series of ball receptacles opening adjacent to its bottom end, the openings communicating with the sleeve centerbore, but sized so that the opening at the centerbore is smaller in diameter than the opening on its outer cylindrical surface,
   C) a generally cylindrical motion restrictor having a central cylindrical portion, an external cylindrical collar on its upper end and an internal cylindrical collar on its lower end,
   D) a collar having means for adjustably positioning on the main outer surface of the sleeve, the collar having a lower edge adjacent to the main outer surface of the sleeve,
   E) a nose cone having a cylindrical body portion having a counterbore at its upper end, the counterbore being sized to slide over the outer surfaces of the collar and the cylindrical body of the motion restrictor, an enlarged bore at the lower end of the nose cone sized to pass ferrules from the open end, an internal shoulder in the nose cone defining the end of the cylindrical body portion and aligned with the collar shoulder to define an annular cylindrical space, a frusto-conical inner surface in the nose cone at the internal shoulder and terminating in a cylindrical area adjacent to the lower end,
   F) a spring trapped in the annular cylindrical space between the nose cone internal shoulder and the collar shoulder urging the nose cone downwardly, and
   G) balls positioned in the sleeve openings and retained therein by the frusto-conical nose cone surface, the balls moving out of the sleeve cylindrical center when the nose cone is moved downwardly relative to the sleeve, thereby freeing a ferrule, and moving into engagement with the next adjacent ferrule when the nose cone is moved upwardly relative to the sleeve by the spring.

6. The ferrule applicator of claim 5 including a removable cover on the top of the barrel member.

7. A ferrule applicator comprising
A) a generally cylindrical barrel having a central opening therethrough, a reduced cylindrical lower portion having an outer surface, and being provided with a circular series of ball retaining openings therethrough adjacent to the lowermost end diameter of the openings being smaller at the central opening than at the outer surface, a series of longitudinal slots through the reduced cylindrical lower portion,
B) balls positioned in the openings,
C) a series of resilient retainer members positioned in and movable through the slots into the barrel central opening,
D) a Z-shaped collar whose upward movement is restricted with respect to the barrel and which is positioned around the barrel, an external shoulder adjoining one end of an external central cylindrical surface, and a lower internal shoulder adjoining a second end of the central cylindrical surface,
E) a nose cone having a central opening having an internal cylindrical surface portion slidable over the outer surface of the barrel, a two stage counterbore on its upper end, the first stage defining an internal surface slidable over the central cylindrical surface of the collar and terminating in an internal shoulder, the second stage connecting the shoulder to the internal cylindrical surface portion, the second stage defining an internal cam surface for moving the resilient retainer members through the slots into the barrel central opening, and a second counterbore on the lowermost end having an internal surface against the balls positioned in the barrel openings, and
F) a spring positioned around the barrel outer surface between the collar lower internal shoulder and the nose cone two stage counterbore internal surface to urge the nose cone and the barrel longitudinally apart.

8. The ferrule applicator of claim 7 wherein the means for restricting the upward movement of the Z-shaped collar is a lock ring which extends outwardly from the outer surface of the barrel and engages the top of the motion restrictor.

9. The ferrule applicator of claim 7 wherein the barrel is in two parts and the means for restricting the upward movement of the Z-shaped collar is a threaded engagement between an internal surface of the one barrel member parts and an external surface of the other barrel member part.

10. The applicator of claim 7 including an end cap on the top end of the barrel.

11. A stack of ferrules for use in a stud welding ferrule applicator, comprising
A) a stack of stud welding ferrules, each said ferrule comprising an annular body, having an upper end and a lower end, an annular upper collar connected to the upper end of the body, the upper collar having an outside diameter less than the outside diameter of the body and having an inside diameter substantially similar to the inside diameter of the body, the body having a series of notches on its lower end,
B) a stack retainer combination including a stem positioned through the center annular openings in the ferrules, a retainer adjacent to the top end of the stem outside the uppermost ferrule in the stack, and a removable retainer adjacent to the bottom end of the stem outside the lowermost ferrule and having a diameter greater than the inside diameter of the ferrules and less than the outside diameter of said ferrules.

12. The invention of claim 11 including an area of weakness on the stem at or above the lower retainer whereby the lower retainer and the lower end of the stem can be severed from the remainder of the stem to free the ferrules from the stack retainer.

13. The invention of claim 12 wherein the lower retainer engages the stem at the area of the weakness.

14. The invention of claim 11 wherein the top retainer has a diameter greater than the outside diameter of the ferrules.

15. A universal ceramic stud welding ferrule for ¾" and ⅞" studs comprising
a) a annular body skirt portion having a top, a wall thickness of from about 0.245" for ¾" studs to about 0.175" for ⅞" studs, an outside diameter of about 1.380±0.010", an inside diameter of about 0.915" for ¾" studs to about 1.050" for ⅞ studs, a height of about 0.590", a notched lower end having vent notches extending about 0.050" to about 0.130" from the lower end into the body, and
b) an annular collar on the upper end, said collar having an outside diameter of 1.200±0.010", and an inside diameter of about 0.778" for ¾" studs to about 0.910" for ⅞" studs.

* * * * *